C. SHURTER.
LEVEL.
APPLICATION FILED OCT. 25, 1917.
1,311,423.
Patented July 29, 1919.
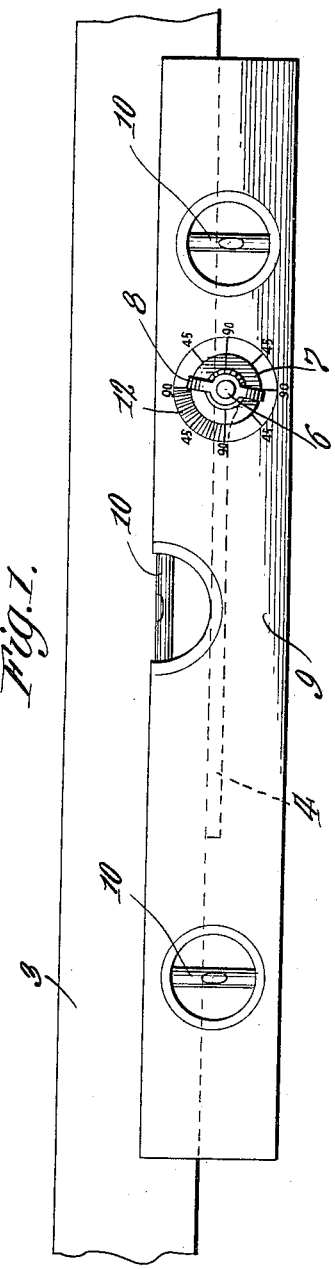
WITNESSES
INVENTOR
Cecil Shurter
BY
ATTORNEY
THE COLUMBIA PLANOGRAPH CO., WASHINGTON, D. C.

UNITED STATES PATENT OFFICE.

CECIL SHURTER, OF KINGSTON, NEW YORK.

LEVEL.

1,311,423. Specification of Letters Patent. Patented July 29, 1919.

Application filed October 25, 1917. Serial No. 198,366.

*To all whom it may concern:*

Be it known that I, CECIL SHURTER, a citizen of the United States, residing at Kingston, in the county of Ulster and State of New York, have invented certain new and useful Improvements in Levels, of which the following is a specification.

My invention relates to new and useful improvements in leveling attachments to rules and the like, and is more particularly of the type used in connection with straight edges whereby a more accurate measurement of angles may be accomplished.

An important object of my invention is to provide a device of the above mentioned character including means for pivotally securing a level to a straight edge thereby making it possible to accurately determine various angles, in view of the fact that the level affords an accurate base for the attachment.

Another object of my invention is to provide a device of the above mentioned character including novel means associated with the level and straight edge for pointing out the angular relation between these two members.

A further object is to provide a device of the above mentioned character so arranged upon a straight edge as to allow the use of the same in any place.

A still further object is to provide a device of the above mentioned character which is strong, durable, inexpensive to manufacture, and is efficient in practice.

Other objects and advantages will be apparent during the course of the following description.

In the accompanying drawings forming a part of the description and wherein like numerals are employed to designate like parts throughout the same, Figure 1 is a side elevation of the members with the device attached, and Fig. 2 is a bottom elevation of the same, parts thereof being broken away to show the manner of pivotally connecting the level to the straight edge.

In the drawings wherein for the purpose of illustration is shown a preferred embodiment of my invention, the numeral 3 designates the usual straight edge or rule, to the bottom of which, adjacent one side thereof, is secured the means of pivotally connecting the level to the rule. This means consists of an elongated flat portion of metal 4 secured to the straight edge by screws, nails or the like, and is provided on one end thereof with an arm 5 which extends at right angles thereto. As more clearly shown in Fig. 2, this arm 5 is circular in cross section and is provided with a reduced shank 6 of substantial length, which is threaded upon its outer end. A circular indicating plate 7 having a central screw threaded opening therein is adapted to be received upon the threaded portion of the shank, and normally remain stationary upon the shank by its screw threaded engagement therewith. This indicator is further provided with indicating marks upon its outer face. A thumb nut 8 is also provided to be received upon the threaded end of the shank to engage the outer face of the indicator 7, for a purpose to be hereinafter set forth.

A level 9 is provided with the usual horizontal and vertical level tubes 10, and a transverse opening adjacent one end thereof, through which, it is pivotally mounted upon the shank 6, between the indicating plate 7 and the abutting wall formed in the arm 5 by the reduction to the shank 6. The level 9 is also provided with a graduated dial 12 which is securely embedded in the side of the level adjacent the indicating plate 7, and has a central opening therein to aline with the opening 11 in the level, to receive a portion of the shank 6.

It will be noted that when the level 9 is placed to register correctly, and the straight edge is swung upon its pivot, the dial 12 being secured to the level, will rotate with the level. Since the indicating plate 7 remains stationary and is provided with indicating marks, and the dial 12 turns around the plate, it will be seen that an angle can be easily ascertained by the graduations in connection with the marks upon the indicating plate. In order to secure the straight edge at any angle to the level, it is only necessary to tighten the thumb nut and increase the friction between the dial 12 and the indicating plate 7.

It is to be understood that the form of my invention herewith shown and described is to be taken as a preferred example of the same and that various changes in the shape, size, and arrangement of parts may be resorted to without departing from the spirit of the invention or the scope of the subjoined claims.

Having described my invention, I claim:

1. An article of the class described comprising a straight edge, an arm rigidly secured thereto at right angles to extend beyond the longitudinal face of the straight edge, an indicator carried by said arm in spaced relation to the straight edge, leveling means pivotally mounted upon the arm between the indicator and the straight edge, and means for retaining the straight edge in any desired angle to said leveling means.

2. An article of the class described, comprising a straight edge, an arm secured thereto, said arms being provided with a reduced shank, an indicator carried by the outer end of said shank, leveling means pivotally arranged upon the inner end of said shank, a dial carried by said leveling means adjacent said indicator, and means for retaining the straight edge at any desired angle to said leveling means.

3. An article of the class described comprising a straight edge, a pintle secured thereto and extending at right angles to said straight edge, said pintle having its outer end reduced and screw threaded at its outermost end, said reduced portion providing a shoulder a substantial distance from said straight edge, leveling means pivotally mounted upon the reduced end of the pintle adjacent said shoulder, indicating means mounted upon the screw threaded portion of said pintle, a thumb nut mounted upon said threaded portion of the pintle for increasing the friction between the indicating means and the leveling means so that the straight edge may be retained at any desired angle to said leveling means.

In testimony whereof I affix my signature in presence of two witnesses.

CECIL SHURTER.

Witnesses:
HARRY SHURTER,
MARTIN M. FAULKNER.